(12) United States Patent
Yang et al.

(10) Patent No.: US 12,181,417 B2
(45) Date of Patent: Dec. 31, 2024

(54) MEASUREMENT SYSTEM FOR MICRO-MIXING AND MEASUREMENT METHOD THEREOF

(71) Applicants: Institute of Process Engineering, Chinese Academy of Sciences, Beijing (CN); Nanjing Jiuzhang Chemical Technology Co., Ltd., JiangSu Province (CN); ZHEJIANG GREATWALL MIXERS CO., LTD., Zhejiang Province (CN)

(72) Inventors: Chao Yang, Beijing (CN); Xiaoxia Duan, Beijing (CN); Xin Feng, Beijing (CN); Dingwang Huang, Beijing (CN); Jie Chen, Beijing (CN); Weipeng Zhang, Beijing (CN); Zheng Li, Beijing (CN); Yuanyuan Li, Beijing (CN); Zaisha Mao, Beijing (CN); Minghui Xie, Beijing (CN)

(73) Assignees: INSTITUTE OF PROCESS ENGINEERING, CHINESE ACADEMY OF SCIENCES (CN); NANJING JIUZHANG CHEMICAL TECHNOLOGY CO., LTD. (CN); ZHEJIANG GREATWALL MIXERS CO., LTD. (CN)

( * ) Notice: Subject to any disclaimer, the term of this patent is extended or adjusted under 35 U.S.C. 154(b) by 0 days.

(21) Appl. No.: 18/422,438

(22) Filed: Jan. 25, 2024

(65) Prior Publication Data

US 2024/0310289 A1 Sep. 19, 2024

(30) Foreign Application Priority Data

Mar. 14, 2023 (CN) .......................... 202310240483.1

(51) Int. Cl.
*G01N 21/84* (2006.01)
*B01F 35/214* (2022.01)
*G01N 21/17* (2006.01)

(52) U.S. Cl.
CPC ........... *G01N 21/84* (2013.01); *B01F 35/214* (2022.01); *G01N 2021/1746* (2013.01); *G01N 2021/8405* (2013.01)

(58) Field of Classification Search
None
See application file for complete search history.

(56) References Cited

U.S. PATENT DOCUMENTS

2007/0054411 A1* 3/2007 Hastings ................ G01N 21/78
436/164
2013/0057675 A1* 3/2013 Jaaskelainen ......... G01F 1/7086
348/84

FOREIGN PATENT DOCUMENTS

CN 1588092 A 3/2005
CN 101393103 A 3/2009
(Continued)

OTHER PUBLICATIONS

Chinese Office Action dated Jul. 5, 2024, Chinese Patent No. 202310240483.1.

*Primary Examiner* — Michael P Stafira
(74) *Attorney, Agent, or Firm* — McDonald Hopkins LLC (57) ABSTRACT

Disclosed are a measurement system for micro-mixing and a measurement method thereof. The measurement system comprises a mixing device, a light enhancement unit, an observation unit, an image acquisition unit, a display device and a tracer injection device; the light enhancement unit comprises a light-emitting device, a light-focusing device and a reflecting device; the observation unit comprises an observation window; the image acquisition unit comprises a distortion-free lens and an image acquisition device which (Continued)

are connected in sequence, and a central axis of the distortion-free lens is in alignment with a central axis of the observation window. The measurement method is performed in the measurement system provided by the present application. In the present application, the brightness of visual field is improved, the light interference on target image is shielded off, the process of micro-mixing can be observed in real time, and thereby the micro-mixing efficiency can be evaluated.

20 Claims, 4 Drawing Sheets

(56) References Cited

FOREIGN PATENT DOCUMENTS

| | | | | | |
|---|---|---|---|---|---|
| CN | 103364377 | A | * | 10/2013 | |
| CN | 103900788 | A | | 7/2014 | |
| CN | 105738648 | A | | 7/2016 | |
| CN | 105928841 | A | | 9/2016 | |
| CN | 105928847 | A | * | 9/2016 | ........... G01B 11/105 |
| CN | 106715670 | A | * | 5/2017 | ............ C12M 41/32 |
| CN | 109725358 | A | | 5/2019 | |
| CN | 110462390 | A | * | 11/2019 | ........... G01N 23/041 |
| CN | 110907420 | A | * | 3/2020 | ............. G01N 21/64 |
| CN | 114755146 | A | * | 7/2022 | |
| CN | 114994355 | A | | 9/2022 | |
| JP | 4288323 | B1 | | 7/2009 | |
| KR | 101919460 | B1 | * | 2/2019 | |
| KR | 2467300 | B1 | * | 11/2022 | ............. G01N 15/06 |

* cited by examiner

MEASUREMENT SYSTEM FOR MICRO-MIXING AND MEASUREMENT METHOD THEREOF

CROSS-REFERENCE TO RELATED APPLICATION(S)

This application claims priority to Chinese Patent Application No. 202310240483.1 filed Mar. 14, 2023 the disclosure of which is incorporated herein by reference in its entirety.

TECHNICAL FIELD

The present application belongs to the field of measurement technology, and specifically relates to a measurement system for micro-mixing and a measurement method thereof.

BACKGROUND

Mixing is one of the important mechanisms of heat transfer, mass transfer and chemical reactions in the reactor. The research scale of mixing is categorized into three levels from large to small: macro-mixing, meso-mixing and micro-mixing. Macro-mixing is based on the reactor scale, and the material is distributed on a large scale by the bulk circulation and turbulent diffusion; meso-mixing reflects the coarse-scale turbulent exchange between the fresh feed and the surroundings; micro-mixing is a homogenization process from Kolmogorov-scale to molecular-scale, that is, the material is dispersed into the smallest lump by turbulence, and the micro-mixing includes the viscous-convective turbulence and the engulfment, deformation and molecular diffusion of lump; the chemical reaction also proceeds at the molecular scale, so the micro-mixing is closely related to the chemical reaction.

The micro-mixing efficiency is usually determined by chemical reaction experiments. A fast competitive reaction system sensitive to the micro-mixing is introduced as a probe model, and the micro-mixing efficiency is indirectly determined by product distribution or segregation index. Such model reaction systems comprise parallel competitive reactions such as acid-base neutralization and hydrolysis of ethyl chloroacetate, or acid-base neutralization and iodide/iodate redox reaction, consecutive competitive reactions such as coupling reaction between a diazotized salt and naphthol, and fast chemical precipitation reactions.

Several patents have been disclosed regarding the measurement of fluid mixing. However, there remains a pressing need to acquire hydrodynamic environments involving turbulence at Kolmogorov scales relevant to micro-mixing. Obtaining information on the micro-scale flow fields provides potent evidence for deducing the model mechanism of micro-mixing. This patent aims to offer possibilities for visualizing micro-mixing.

CN108106981A discloses a method for measuring liquid flow in a saturated porous medium. In this method, a fluorescent pore liquid is allowed to continuously flow downwards in the porous transparent medium, and a sector laser is generated by a laser device through lens, and enters a saturated porous transparent medium, and interacts with the fluorescent particles in the flowing interstitial liquid to produce laser speckle effect. The digital camera captures images of laser speckle plane in the saturated porous transparent medium at different times, and the correlation analysis is performed to obtain the displacement and velocity values and vectors of the motion of the fluorescent particles, so as to obtain the magnitude and vector diagram of flow velocity of interstitial liquid, and by combining the flow velocity with the calibration parameters of the digital camera, the actual displacement and velocity value are obtained, and the distribution and direction of flow velocity of fluid in the saturated transparent porous medium are obtained, which is of great significance to study the change rule of velocity field of interstitial flow in the saturated porous medium in nature.

CN102798512A discloses a device for measuring a three-dimensional flow field image using a single lens and a method therefor, in which a polarization light source is used to illuminate the flow field to be measured, and the light passing through the camera lens is divided into two beams by a beam-splitter prism, and analyzed by polarizers respectively, and imaged by two CCD or CMOS image sensors respectively; the distance between the position of the tracer particle and the focusing plane is calculated according to the defocusing amount of the tracer particle in a single picture, so as to uniquely determine a three-dimensional position of the tracer particle, and the three-dimensional motion velocity of the tracer particle is further obtained by combining the position with the motion blur parameters, that is, the information of the three-dimensional flow field is obtained, simplifying the measurement system and data processing process, and reducing the system cost.

CN105738648 discloses a real-time measurement method for particle velocity in a multiphase system. By coupling the multiple exposure technology and the particle matching algorithm, the velocity distribution of particles such as bubbles, droplets, or solids in a multiphase reactor can be measured in real time. According to the invasive error analysis obtained by CFD simulation, an error of the particle velocity measured by the camera probe is less than 15%. The method in this patent can be applied to the properties and behaviors measurement of bubbles in the gas-liquid system, but the telecentric lens has a small magnification and a large visual field, the collected images cannot meet the measurement-scale requirements of micro-mixing, and the light intensity of the illumination system cannot overcome the problem of dim image of the high-magnification telecentric lens caused by gas-phase scattering and refraction.

In view of the above, the present application provides a measurement system for micro-mixing and a measurement method thereof, enhancing the brightness of the visual field and the sharpness of the image, and the process of micro-mixing can be observed in real time, and thereby the micro-mixing efficiency can be evaluated.

SUMMARY

An object of the present application is to provide a measurement system for micro-mixing and a measurement method thereof, and the measurement system can be used to observe the micro-mixing process by capturing the vortices in real time, and to explain the micro-mixing behaviors of the fresh lump such as deformation, engulfment and diffusion, and eventually to evaluate the micro-mixing efficiency.

To achieve the above object, the present application uses the following technical solutions.

In a first aspect, the present application provides a measurement system for micro-mixing, and the measurement system comprises a mixing device, a light enhancement unit, an observation unit, an image acquisition unit, a display device and a tracer injection device;

the light enhancement unit comprises a light-emitting device, a light-focusing device and a reflecting device; the light-focusing device focuses light emitted from the light-emitting device onto the reflecting device;

the observation unit comprises an observation window; one end of the observation window is located inside the mixing device, and the other end is located outside the mixing device;

the image acquisition unit comprises a distortion-free lens and an image acquisition device which are connected in sequence, and a central axis of the distortion-free lens is in alignment with a central axis of the observation window;

the image acquisition device is electrically connected with the display device;

an injection terminal of the tracer injection device is located on a focal plane of the image acquisition device.

The measurement system provided by the present application is operated in the following manner: the objects to be measured are mixed in the mixing device; light is emitted from the light-emitting device in the light enhancement unit, and concentrated by the light-focusing device and projected onto the reflecting device, and then the brightness at the field of view of the image acquisition device is improved by the reflection effect of the reflecting device. The arrangement of the observation window and the distortion-free lens can avoid excessive loss of light in the propagation path, and, in conjunction with the light enhancement unit and the tracer injected by the tracer injection device, can clearly visualize the micro-mixing behaviors during feeding such as engulfment, deformation and diffusion; the dynamic feeding process can be observed as images by the display device in real time, realizing the measurement of micro-mixing.

By the light-focusing device in the present application, the light emitted from the light-emitting device is focused into a coaxial beam and focused onto the reflecting device, improving the brightness of the visual field, and the surrounding light interference is shielded off by the observation window, which protects the target imaging from the interference of scattered light or refracted light.

Preferably, a shape of the reflecting device comprises a quadrangle or a circle.

The selected shape of the reflecting device in the present application has less interference on the flow field in the mixing device, which can reduce the influence on the local micro-mixing of the observation point.

Preferably, the end of the observation window inside the mixing device comprises a sapphire glass provided with an anti-reflection film.

In the present application, except for the sapphire glass, the other part of the end of the observation window inside the mixing device is opaque, shielding off the interference of reflected light or refracted light coming from regions other than the observation area.

Preferably, the light-emitting device comprises an LED light source.

In the present application, the LED light source is used as the light-emitting device instead of expensive and complex laser source, which has the advantages of strong operability and low power consumption.

Preferably, a power of the LED light source is 10-150 W, which can be, for example, 10 W, 20 W, 30 W, 50 W, 80 W, 100 W, 120 W or 150 W; however, the power is not limited to the listed values, and other unlisted values within the numerical range are also applicable.

Preferably, a luminous flux of the LED light source is 1500-10000 lm, which can be, for example, 1500 lm, 2000 lm, 2500 lm, 3000 lm, 3500 lm, 4000 lm, 5000 lm, 6000 lm, 7000 lm, 8000 lm, 9000 lm or 10000 lm; however, the luminous flux is not limited to the listed values, and other unlisted values within the numerical range are also applicable.

Preferably, the light-focusing device comprises a convex lens.

A focal length of the convex lens is determined by the distance relation among the actual observation point, the convex lens and the LED light source.

Preferably, the image acquisition device comprises a high-speed industrial camera; the high-speed industrial camera is electrically connected with the display device by an optical fiber.

In the present application, the high-speed industrial camera is selected as the image acquisition device, which is convenient for the researcher to adjust the test conditions according to the real-time image displayed on the display device.

Exemplarily, if the bubble shown in the image on the display device has motion trailing, the frame rate can be adaptively increased, and if the brightness of the image on the display device is insufficient, the exposure time of the camera can be adaptively increased.

Preferably, the tracer injection device comprises an injector.

In a second aspect, the present application provides a measurement method of the measurement system according to the first aspect, and the measurement method comprises the following steps:

(1) adding materials into a mixing device for mixing; and (2) injecting a tracer, and capturing an image of micro-mixing;

in step (2), a ratio of an injection rate of the tracer to a critical feeding rate is (0.8-1):1;

the critical feeding rate refers to the maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to the lowest stirring speed and location with the weakest turbulence.

In the present application, the ratio of the injection rate of the tracer to the critical feeding rate is (0.8-1):1, which, for example, is conducive to observing the micro-mixing process, explaining the deformation, engulfment and diffusion behaviors of the lump, thereby evaluating the micro-mixing efficiency, and can be 0.8:1, 0.85:1, 0.9:1, 0.95:1 or 1:1; however, the ratio is not limited to the listed values, and other unlisted values within the numerical range are also applicable. When the injection rate is lower than the critical feeding rate, the micro-mixing efficiency has no relation to the feeding rate, but when the ratio of the injection rate to the critical feeding rate is less than 0.8:1, the feed amount per unit time is decreased, the vortex shape is smaller, and the contrast ratio of the tracer to the background is decreased, which affects the measurement of the micro-mixing; when the injection rate is higher than the critical feeding rate, the process of tracer mixing is effected by meso-mixing and macro-mixing, which interferes the observation of micro-mixing.

Preferably, the materials in step (1) comprise a gas-phase material and a liquid-phase material.

The measurement method provided by the present application is applicable to the measurement of micro-mixing in the gas-liquid system where the gas phase is an inert phase, and can also be used for the measurement of micro-mixing in the real gas-liquid reaction system where the gas phase participates in the reaction, and can also be extended to the measurement of micro-mixing of the single-liquid-phase system and the solid-liquid system.

Preferably, the mixing in step (1) is performed at a temperature of 0-80° C., which can be, for example, 0° C., 5° C., 10° C., 20° C., 30° C., 40° C., 50° C., 60° C., 70° C. or 80° C.; however, the temperature is not limited to the listed values, and other unlisted values within the numerical range are also applicable.

Further preferably, the mixing in step (1) is performed at the temperature of 10-40° C., which can be, for example, 10° C., 15° C., 20° C., 25° C., 30° C. or 40° C.; however, the temperature is not limited to the listed values, and other unlisted values within the numerical range are also applicable.

Preferably, the mixing in step (1) is accompanied by stirring.

Preferably, the stirring is performed at a speed of 200-800 r/min, which can be, for example, 200 r/min, 300 r/min, 400 r/min, 500 r/min, 600 r/min, 700 r/min or 800 r/min; however, the speed is not limited to the listed values, and other unlisted values within the numerical range are also applicable.

Preferably, the tracer in step (2) comprises a polystyrene microsphere solution and/or an ink, preferably a polystyrene microsphere solution.

Preferably, the polystyrene microsphere solution has a solid content of 2.5-10%, which can be, for example, 2.5%, 3%, 4%, 5%, 6%, 7%, 8%, 9% or 10%; however, the solid content is not limited to the listed values, and other unlisted values within the numerical range are also applicable.

Preferably, the polystyrene microsphere solution has a D50 particle size of 50-100 nm, which can be, for example, 50 nm, 60 nm, 70 nm, 80 nm, 90 nm or 100 nm; however, the D50 particle size is not limited to the listed values, and other unlisted values within the numerical range are also applicable.

As a preferred technical solution of the measurement method in the second aspect of the present application, the measurement method comprises the following steps:
  (1) adding a gas-phase material and a liquid-phase material into the mixing device at 10-40° C. for mixing; and
  (2) injecting a polystyrene microsphere solution with a solid content of 2.5-10% and a D50 particle size of 50-100 nm, and capturing an image of micro-mixing;
  a ratio of an injection rate of the polystyrene microsphere solution to a critical feeding rate is (0.8-1):1;
  the critical feeding rate refer to the maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to the lowest stirring speed and location with the weakest turbulence.

Compared with the prior art, the present application has the following beneficial effects.

The present application provides a measurement system for micro-mixing and a measurement method thereof, and the measurement system is provided with a light enhancement unit, improving the brightness in the visual field, and the surrounding light interference is shielded off by the observation window, which protects the target imaging from the interference of scattered light or refracted light, and in the measurement method, the ratio of the injection rate of the tracer to the critical feeding rate is controlled at a range of (0.8-1):1, which is conducive to observing the micro-mixing process in real time, explaining the deformation, engulfment and diffusion behaviors of the lump, thereby directly evaluating the micro-mixing efficiency.

Reference list: 11—stirred tank; 12—stirrer; 13—annular gas distributor; 21—light-emitting device; 22—light-focusing device; 23—reflecting device; 31—observation window; 41—distortion-free lens; 42—image acquisition device; 5—display device; 61—injector; and 7—optical fiber.

DETAILED DESCRIPTION

The technical solutions of the present application are further illustrated via embodiments. It should be understood by those skilled in the field that the examples are merely used for a better understanding of the present application and should not be regarded as a specific limitation of the present application.

It should be understood that in the description of the measurement system in the present application, the orientation or position relationship indicated by the terms, such as "center", "longitudinal", "lateral", "up", "down", "front", "back", "left", "right", "vertical", "horizontal", "top", "bottom", "inside", "outside", etc., is based on the orientation or position relationship shown in the drawings, which is only intended to facilitate the description of the measurement system in the present application and to simplify the description, but not to indicate or imply that the device or element referred to must have a particular orientation or must be constructed and operated in a specific orientation, and therefore cannot be understood as a limitation of the present application.

It should be noted that in the description of the measurement system in the present application, unless otherwise specified or limited, the terms such as "arrange", "connect" and "attach" are to be understood in a broad sense, for example, as a fixed connection, or as a detachable connection, or as an integrated connection; as a mechanical connection, or as an electrical connection; as a direct connection, or as an indirect connection via an intermediate medium, or as a communication between two elements. For those skilled in the field, the specific meaning of the above terms can be understood in the light of specific cases in the present application.

The technical solutions of the present application are further explained with reference to the accompanying drawings and embodiments.

Example 1

Figure 1:
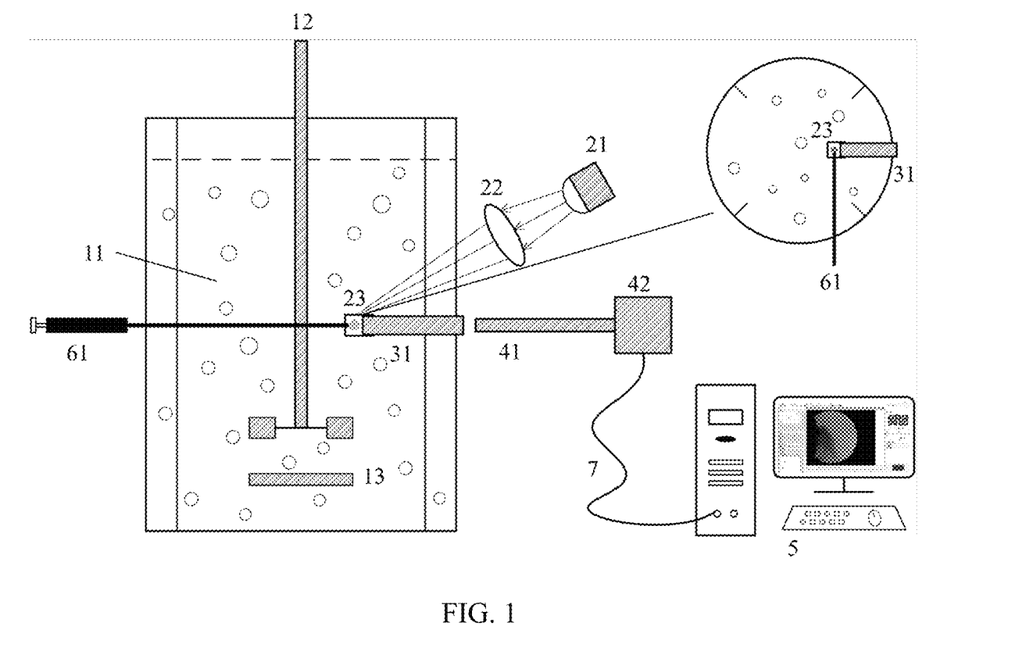
FIG. 1 is a schematic diagram of a measurement system provided in Example 1 of the present application.

The example provides a measurement system for micro-mixing, as shown in FIG. 1, and the measurement system comprised a mixing device, a light enhancement unit, an observation unit, an image acquisition unit, a display device 5 and a tracer injection device;

the mixing device comprised a stirred tank 11, a stirrer 12 and an annular gas distributor 13; the stirred tank 11 had an inner diameter of 210 mm and a height of 280 mm and were mounted with four vertical baffles with a width of 21 mm at equal intervals; the stirrer 12 was a standard Rushton turbine with a diameter of 70 mm, and was arranged 70 mm above the bottom; a diameter of the annular gas distributor 13 was 70 mm, and 20 gas outlets with a diameter of 0.5 mm were evenly distributed face downward, and the annular distributor was 35 mm above the bottom;

the light enhancement unit comprised a light-emitting device 21, a light-focusing device 22 and a reflecting device 23; the light-focusing device 22 focused light emitted from the light-emitting device 21 onto the reflecting device 23; the light-emitting device 21 comprised an LED light source with a power of 27 W and a luminous flux of 2300 lm; the light-focusing device 22 comprised a convex lens; and the reflecting device 23 was circular in shape;

the observation unit comprised an observation window 31; one end of the observation window 31 was located inside the mixing device, and the other end was located outside the mixing device; the end of the observation window 31 inside the mixing device comprised a sapphire glass provided with an anti-reflection film;

the image acquisition unit comprised a distortion-free lens 41 and an image acquisition device 42; a central axis of the distortion-free lens 41 was in alignment with a central axis of the observation window 31; relevant parameters of the distortion-free lens 41 comprised: a magnification factor of 8, a field of view $\Phi$ of 1.95 mm, a resolution of 7.5 μm, a depth of field of 0.16 mm, and an optical distortion of less than −0.021%; the image acquisition device comprised a high-speed industrial camera, and relevant parameters of the high-speed industrial camera comprised: a CMOS image sensor with a resolution of 1280×800, black and white imaging, and a maximum frame rate of 690000 fps;

the display device 5 was electrically connected with the image acquisition device 42 by an optical fiber 7;

the tracer injection device comprised an injector 61; an injection terminal of the tracer injection device was located on a focal plane of the image acquisition device 42.

The measurement system provided by the present application is operated in the following manner: the objects to be measured are mixed in the mixing device; light is emitted from the light-emitting device 21 in the light enhancement unit, and concentrated by the light-focusing device 22 and projected onto the reflecting device 23, and then the brightness at the field of view of the image acquisition device is improved by the reflection effect of the reflecting device 23; the arrangement of the observation window 31 and the distortion-free lens 41 can avoid excessive loss of light in the propagation path, and, in conjunction with the light enhancement unit and the tracer injected by the tracer injection device, can clearly visualize the micro-mixing behaviors of the lump of non-premixed fluids during feeding such as engulfment, deformation and diffusion; the dynamic feeding process can be observed as images by the display device 5 in real time, realizing the measurement of micro-mixing.

Example 2

Figure 2:
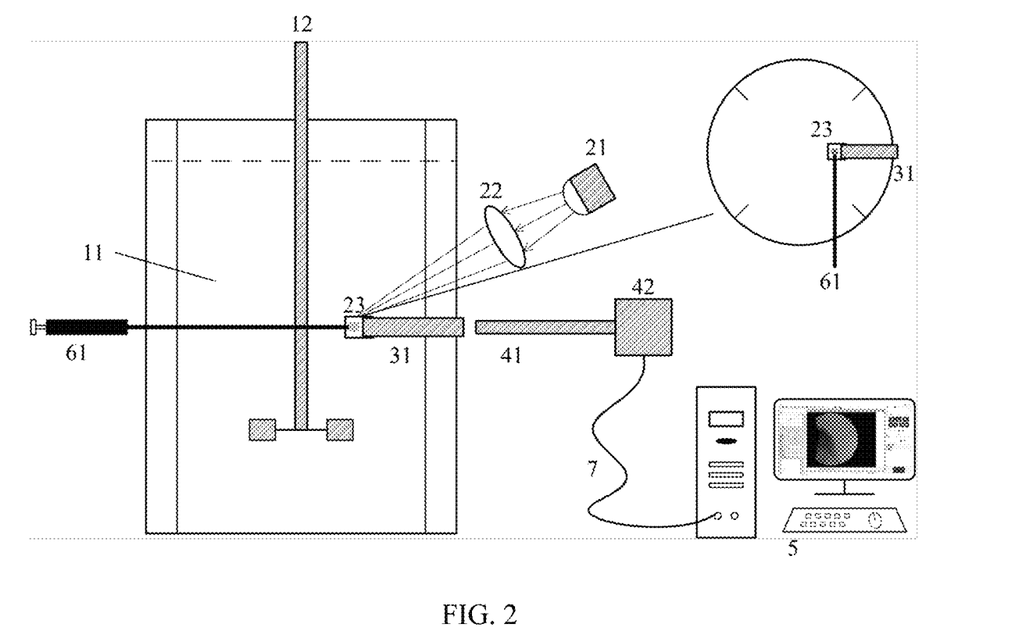
FIG. 2 is a schematic diagram of a measurement system provided in Example 2 of the present application.

The example provides a measurement system for micro-mixing, as shown in FIG. 2, and the measurement system comprised a mixing device, a light enhancement unit, an observation unit, an image acquisition unit, a display device 5 and a tracer injection device;

the mixing device comprised a stirred tank 11 and a stirrer 12; the stirred tank 11 had an inner diameter of 210 mm and a height of 280 mm, and were mounted with four vertical baffles with a width of 21 mm at equal intervals; the stirrer was a standard Rushton turbine with a diameter of 70 mm, and was arranged 70 mm above the bottom;

the light enhancement unit comprised a light-emitting device 21, a light-focusing device 22 and a reflecting device 23; the light-focusing device 22 focused light emitted from the light-emitting device 21 onto the reflecting device 23; the light-emitting device 21 comprised an LED light source with a power of 27 W and a luminous flux of 1500 lm; the light-focusing device 22 comprised a convex lens; and the reflecting device 23 was circular in shape;

the observation unit comprised an observation window 31; one end of the observation window 31 was located inside the mixing device, and the other end was located outside the mixing device; the end of the observation window 31 inside the mixing device comprised a sapphire glass provided with an anti-reflection film.

the image acquisition unit comprised a distortion-free lens 41 and an image acquisition device 42; a central axis of the distortion-free lens 41 was in alignment with a central axis of the observation window 31; relevant parameters of the distortion-free lens 41 comprised: a magnification factor of 10, a field of view $\Phi$ of 1.30 mm and an optical distortion of less than 0.01%; the image acquisition device comprised a high-speed industrial camera, and relevant parameters of the high-speed industrial camera comprised: a CMOS image sensor with a resolution of 1280×800, black and white imaging, and a maximum frame rate of 690000 fps;

the display device 5 was electrically connected with the image acquisition device 42 by an optical fiber 7;

the tracer injection device comprised a injector 61; an injection terminal of the tracer injection device was located on a focal plane of the image acquisition device 42.

The measurement system provided by the present application is operated in the following manner: the objects to be measured are mixed in the mixing device; light is emitted from the light-emitting device 21 in the light enhancement unit, and concentrated by the light-focusing device 22 and projected onto the reflecting device 23, and then the brightness at the field of view of the image acquisition device is improved by the reflection effect of the reflecting device 23; the arrangement of the observation window 31 and the distortion-free lens 41 can avoid excessive loss of light in the propagation path, and, in conjunction with the light enhancement unit and the tracer injected by the tracer injection device, can clearly visualize the micro-mixing behaviors of the lump of non-premixed fluids during feeding such as engulfment, deformation and diffusion; the dynamic feeding process can be observed as images by the display device 5 in real time, realizing the measurement of micro-mixing.

Comparative Example 1

This comparative example provides a measurement system for micro-mixing, and the measurement system does not comprise a light enhancement unit 2, and the rest is the same as in Example 1.

Comparative Example 2

This comparative example provides a measurement system for micro-mixing, and the measurement system does not comprise an observation unit 3, and the rest is the same as in Example 1.

The following application examples are performed in the measurement systems provided by the above examples and comparative examples.

Application Example 1

Figure 3:
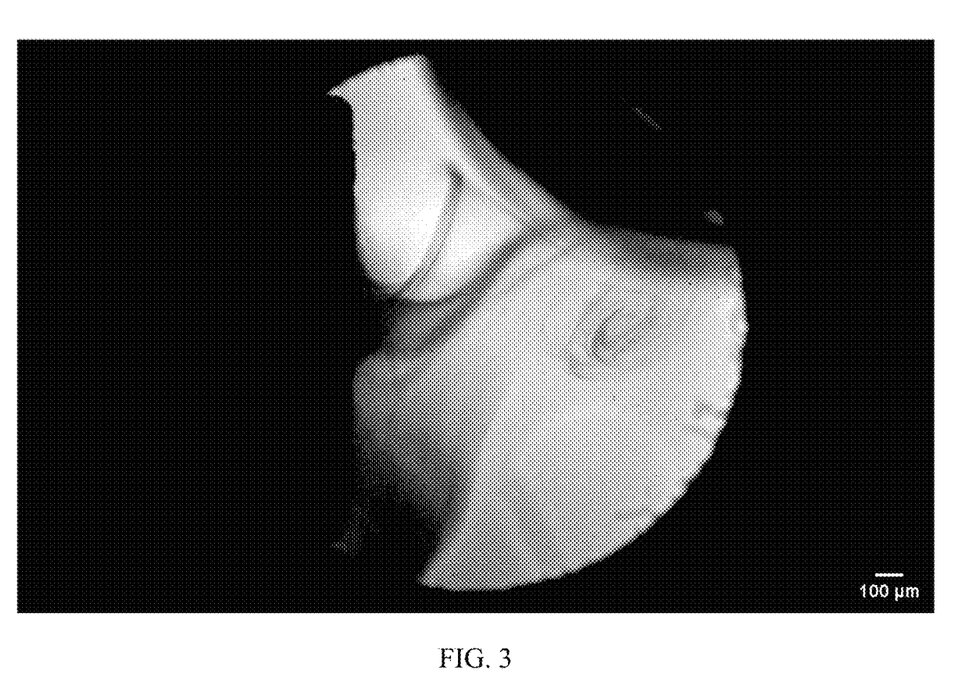
FIG. 3 is an image showing micro-mixing of a gas-liquid system obtained in Application Example 1.

This application example provides a measurement method for micro-mixing, and the measurement method is performed in the measurement system provided by Example 1, specifically comprising the following steps:
(1) high-purity nitrogen was used as the gas phase, a boric acid/sodium hydroxide buffer solution was used as the liquid phase, and the gas-phase material and the liquid-phase material were added to the mixing device at 30° C. for mixing, and the mixing was accompanied by stirring at a speed of 360 rpm; and
(2) a polystyrene microsphere solution with a solid content of 2.5% and a D50 particle size of 100 nm was injected, and an image of micro-mixing was captured, as shown in FIG. 3;
a ratio of an injection rate of the polystyrene microsphere solution to a critical feeding rate was 0.9:1;
the critical feeding rate refers to the maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to the lowest stirring speed and location with the weakest turbulence.

Application Example 2

Figure 4:
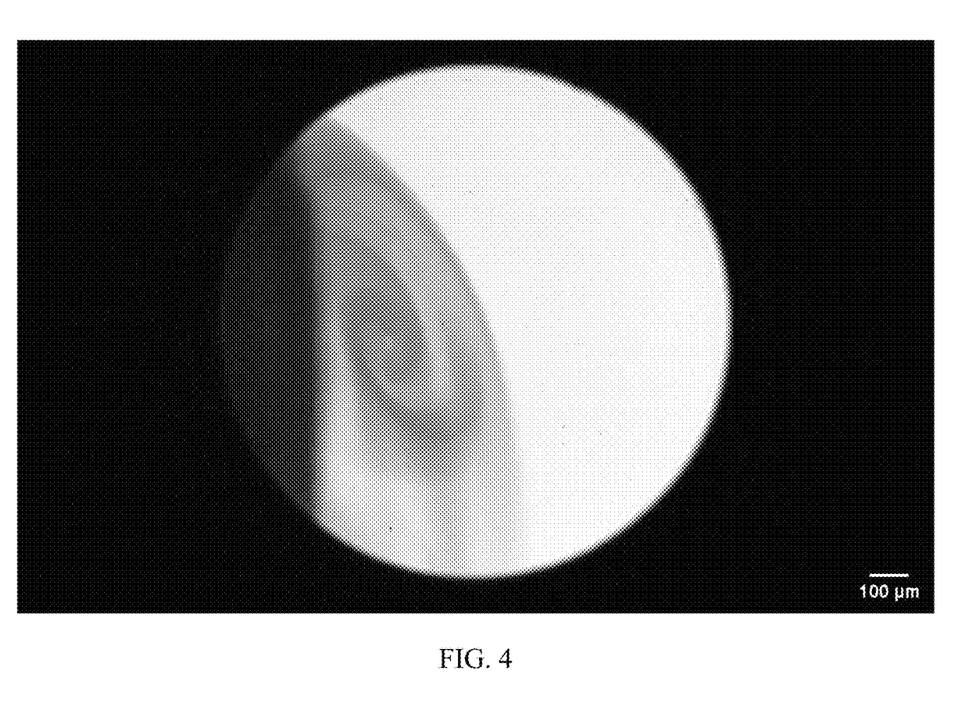
FIG. 4 is an image showing micro-mixing of a single-liquid-phase system obtained in Application Example 2.

This application example provides a measurement method for micro-mixing, and the measurement method is performed in the measurement system provided by Example 2, specifically comprising the following steps:
(1) deionized water was added to the mixing device and stirred at 360 rpm; and
(2) a polystyrene microsphere solution with a solid content of 2.5% and a D50 particle size of 100 nm was injected, and an image of micro-mixing was captured, as shown in FIG. 4;
a ratio of an injection rate of the polystyrene microsphere solution to a critical feeding rate was 1:1;
the critical feeding rate refers to the maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to the lowest stirring speed and location with the weakest turbulence.

Application Example 3

Figure 5:
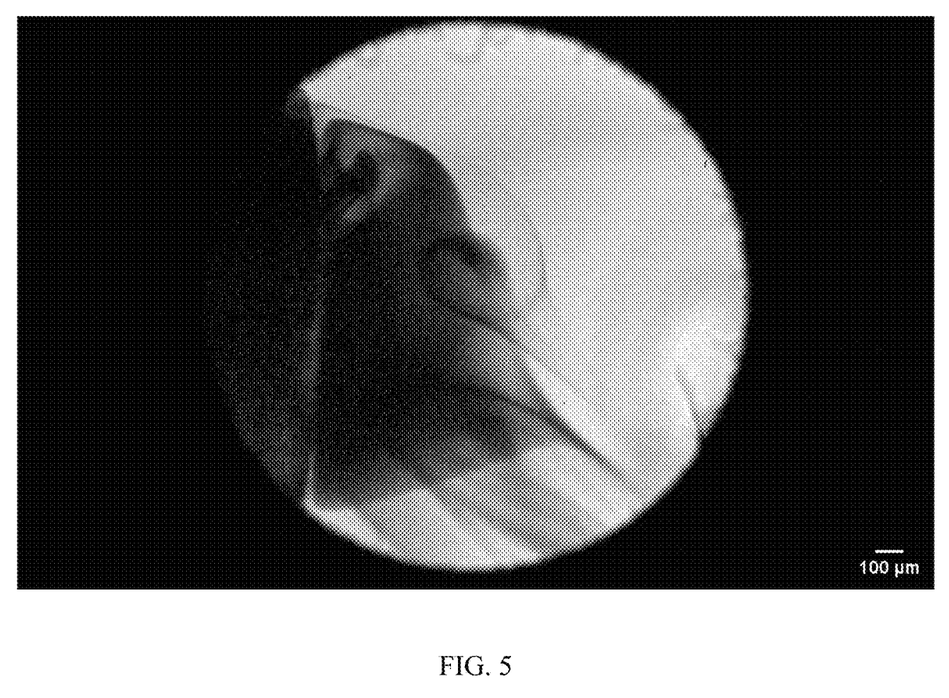
FIG. 5 is an image showing micro-mixing obtained in Application Example 3.

This application example provides a measurement method for micro-mixing, and in the measurement method, except that the injected polystyrene microsphere solution is replaced with an ink, the rest is the same as in Application Example 1. The obtained image of micro-mixing is shown in FIG. 5.

Comparative Application Example 1

Figure 6:
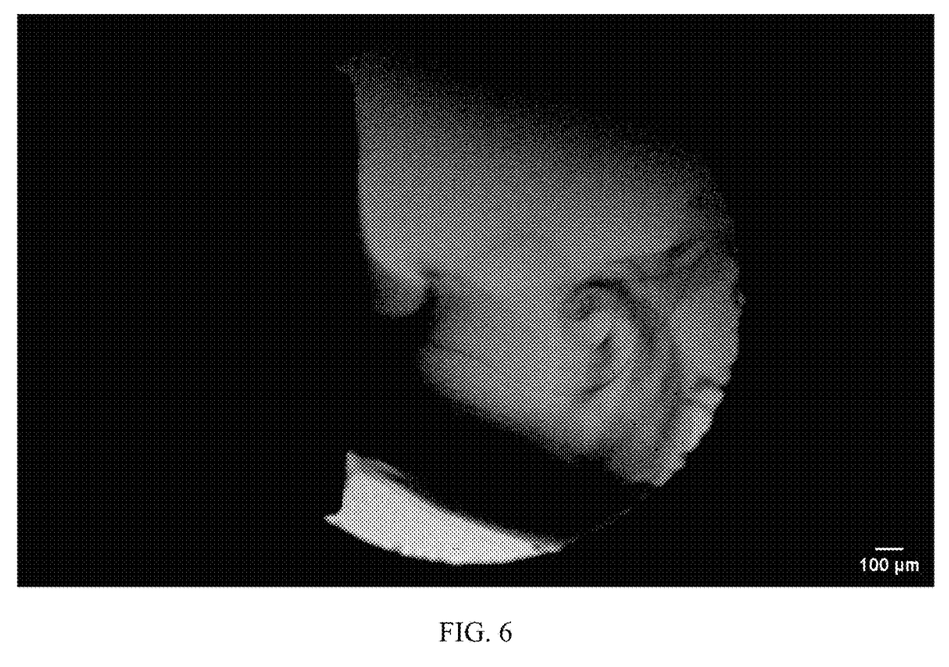
FIG. 6 is an image showing micro-mixing obtained in Comparative Application Example 1.

This comparative application example provides a measurement method for micro-mixing, and except that the measurement method is performed in the measurement system provided by Comparative Example 1, the rest is the same as in Application Example 1. The obtained image of micro-mixing is shown in FIG. 6.

Comparative Application Example 2

Figure 7:
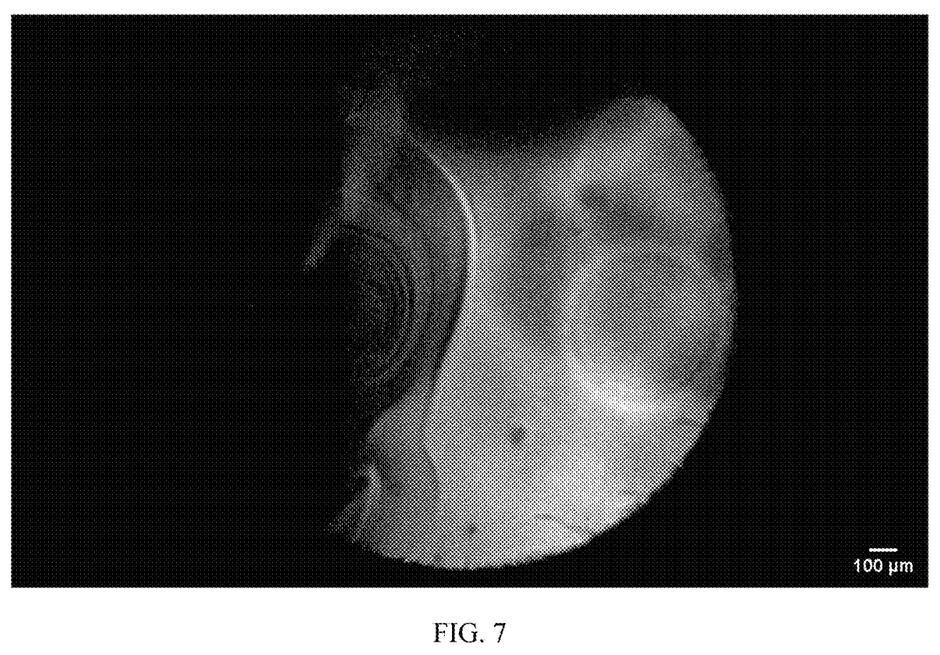
FIG. 7 is an image showing micro-mixing obtained in Comparative Application Example 2.

This comparative application example provides a measurement method for micro-mixing, and except that the measurement method is performed in the measurement system provided by Comparative Example 2, the rest is the same as in Application Example 1. The obtained image of micro-mixing is shown in FIG. 7.

Comparative Application Example 3

Figure 8:
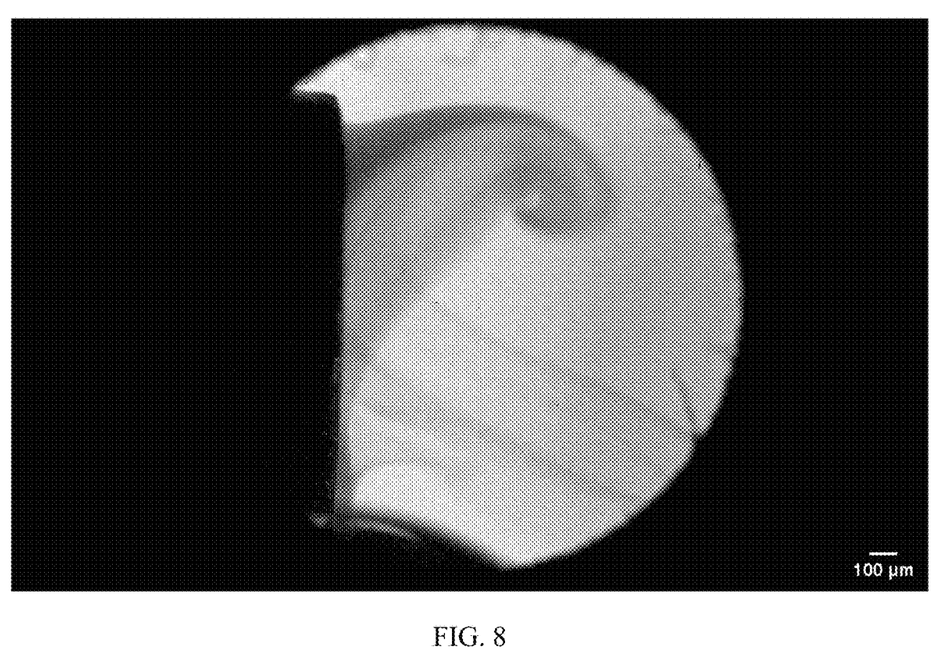
FIG. 8 is an image showing micro-mixing obtained in Comparative Application Example 3.

This comparative application example provides a measurement method for micro-mixing, and in the measurement method, except that a ratio of an injection rate of the polystyrene microsphere solution to a critical feeding rate is 0.5:1, the rest is the same as in Application Example 1. The obtained image of micro-mixing is shown in FIG. 8.

Performance Test

Images of the micro-mixing obtained by Application Examples 1-3 and Comparative Application Examples 1-3 are shown in FIGS. 3-8.

FIG. 3 is an image showing the micro-mixing of the gas-liquid system obtained in Application Example 1, it can be seen that the tracer (polystyrene microsphere solution) is entrained in the negative-pressure zone behind the bubble and distributed near the motion trail of the bubble, and there is an engulfment vortex in the left center of the image, and a maximum diameter of the vortex is about 390 μm.

FIG. 4 is an image showing the micro-mixing of the single-liquid-phase system obtained in Application Example 2, and it can be seen that the tracer (polystyrene microsphere solution) is self-entrained at the nozzle, the shape of the vortex is complete and the edge is clear, the flow is rotating clockwise inwards and deformed, and the outermost diameter of the vortex measures approximately 420 μm.

FIG. 5 is an image showing the micro-mixing obtained in Application Example 3, and it can be seen that when the ink is used as the tracer, there are two engulfment vortices near the nozzle, and maximum diameters of the vortices are about 280 μm and 260 μm, respectively. Compared with FIG. 3, the detail in the dark part is lost, the vortex profile is rough, and the brightness of visual field is decreased with the accumulation of the ink in the mixing device. Therefore, the polystyrene microsphere solution is preferred as a tracer.

FIG. 6 and FIG. 7 are images showing the micro-mixing obtained by Comparative Application Example 1 and Comparative Application Example 2, respectively, and it can be seen that when the measurement system lacks a light enhancement unit or an observation window, due to the refraction and reflection at the gas-liquid interface, light spots will appear around the bubbles, resulting in uneven brightness in imaging, local overexposure and distortion, and indistinguishable vortex size. Compared with FIG. 3, the light enhancement unit in the present application improves the brightness of the visual field, and the surrounding light interference is shielded off by the observation window, which protects the target imaging from the interference of scattered light or refracted light. Therefore, the measurement system provided by the present application can be used to better observe the micro-mixing process in real time, and to explain the deformation, engulfment and diffusion behaviors of the lump, and eventually to evaluate the micro-mixing efficiency.

FIG. 8 is an image showing the micro-mixing obtained by Comparative Application Example 3, when the ratio of the injection rate of the polystyrene microsphere solution to the critical feeding rate is 0.5:1, the feed amount per unit time is decreased, and compared with FIG. 3, the shape of the vortex is smaller, the maximum diameter is about 320 μm, and the contrast ratio of the tracer to the background is reduced. In the present application, the ratio of the injection rate of the tracer to the critical feeding rate is controlled within a range of (0.8-1):1, which is conducive to observing the micro-mixing process, explaining the deformation, engulfment and diffusion behaviors of the lump, thereby evaluating the micro-mixing efficiency.

In conclusion, the present application provides a measurement system for micro-mixing and a measurement method thereof, the measurement system is provided with a light enhancement unit, improving the brightness in the visual field, and the surrounding light interference is shielded off by the observation window, which protects the target imaging from the interference of scattered light or refracted light, and in the measurement method, the ratio of the injection rate of the tracer to the critical feeding rate is controlled within a range of (0.8-1):1, which is conducive to observing the micro-mixing process in real time, and explaining the deformation, engulfment and diffusion behaviors of the lump, thereby directly evaluating the micro-mixing efficiency.

The above are only the embodiments of the present application, but the protection scope of the present application is not limited thereto. Those skilled in the art should understand that any change or replacement that can be easily thought of by a person skilled in the art within the scope of the technology disclosed in the present application shall fall within the protection and disclosure scope of the present application.

What is claimed is:

1. A measurement system for micro-mixing, comprising a mixing device, a light enhancement unit, an observation unit, an image acquisition unit, a display device and a tracer injection device;
    the light enhancement unit comprises a light-emitting device, a light-focusing device and a reflecting device; the light-focusing device focuses light emitted from the light-emitting device onto the reflective device;
    the observation unit comprises an observation window; one end of the observation window is located inside the mixing device, and the other end is located outside the mixing device;
    the image acquisition unit comprises a distortion-free lens and an image acquisition device which are connected in sequence, and a central axis of the distortion-free lens is in alignment with a central axis of the observation window;
    the image acquisition device is electrically connected with the display device;
    an injection terminal of the tracer injection device is located on a focal plane of the image acquisition device.

2. The measurement system according to claim 1, wherein a shape of the reflecting device comprises a quadrangle or a circle.

3. The measurement system according to claim 1, wherein the light-emitting device comprises an LED light source.

4. The measurement system according to claim 1, wherein the light-focusing device comprises a convex lens.

5. The measurement system according to claim 1, wherein the image acquisition device comprises a high-speed industrial camera; the high-speed industrial camera is electrically connected with the display device by an optical fiber.

6. A measurement method of the measurement system according to claim 1, wherein the measurement method comprises the following steps:
    (1) adding materials into the mixing device for mixing; and
    (2) injecting a tracer, and capturing an image of micro-mixing;
    in step (2), a ratio of an injection rate of the tracer to a critical feeding rate is (0.8-1):1;
    the critical feeding rate refers to a maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to a lowest stirring speed and location with the weakest turbulence.

7. The measurement method according to claim 6, wherein the materials in step (1) comprise a gas-phase material and a liquid-phase material.

8. The measurement method according to claim 6, wherein the mixing in step (1) is performed at a temperature of 0-80° C.

9. The measurement method according to claim 8, wherein the tracer in step (2) comprises a polystyrene microsphere solution and/or an ink.

10. The measurement method according to claim 6, wherein the measurement method comprises the following steps:
    (1) adding a gas-phase material and a liquid-phase material to the mixing device at 10-40° C. for mixing; and
    (2) injecting a polystyrene microsphere solution with a solid content of 2.5-10% and a D50 particle size of 50-100 nm, and capturing an image of micro-mixing;
    a ratio of an injection rate of the polystyrene microsphere solution to a critical feeding rate is (0.8-1):1;
    the critical feeding rate refers to a maximum feeding rate used to assess the micro-mixing efficiency, corresponding to the scenarios where micro-mixing significantly influences the selectivity of the model competitive reaction system, rather than meso-mixing or macro-mixing, under conditions most adverse for mixing; the most adverse conditions refer to a lowest stirring speed and location with the weakest turbulence.

11. The measurement system according to claim 1, wherein the end of the observation window inside the mixing device comprises a sapphire glass provided with an anti-reflection film.

12. The measurement system according to claim 3, wherein a power of the LED light source is 10-150 W.

13. The measurement system according to claim 3, wherein a luminous flux of the LED light source is 1500-10000 lm.

14. The measurement system according to claim 1, wherein the tracer injection device comprises an injector.

15. The measurement method according to claim 6, wherein the mixing in step (1) is performed at a temperature of 10-40° C.

16. The measurement method according to claim 6, wherein the mixing in step (1) is accompanied by stirring.

17. The measurement method according to claim 16, wherein the stirring is performed at a speed of 200-800 r/min.

18. The measurement method according to claim 6, wherein the tracer is a polystyrene microsphere solution.

19. The measurement method according to claim 18, wherein the polystyrene microsphere solution has a solid content of 2.5-10%.

20. The measurement method according to claim 18, wherein the polystyrene microsphere solution has a D50 particle size of 50-100 nm.

* * * * *